350-376 SR

XR 3,696,346 TX 4029 D

United States

Zook

[11] 3,696,346

[45] Oct. 3, 1972

[54] BEAM ADDRESSED OPTICAL MEMORY

[72] Inventor: James David Zook, Burnsville, Minn.

[73] Assignee: Honeywell Inc., Minneapolis, Minn.

[22] Filed: Aug. 30, 1971

[21] Appl. No.: 175,884

[52] U.S. Cl........340/174 YC, 340/174.1 M, 350/151

[51] Int. Cl...........................G11c 11/42, G11c 11/14

[58] Field of Search.............340/174 YC, 174.1 MD; 346/74 MT; 350/151

[56] References Cited

UNITED STATES PATENTS

| | | |
|---|---|---|
| 3,500,354 | 3/1970 | Smith et al. ..........340/174 YC |
| 3,631,415 | 12/1971 | Aagard................340/174 YC |

OTHER PUBLICATIONS

IBM Technical Disclosure Bulletin, " Magnetic Keeper & Passivation Layer for Beam Addressable Memory" by Ahn et al, vol. 11, No. 6, 11/68, p. 611, 612.

IEEE Transaction Magnetics, " A New Direct Measure of the Domain Wall Energy of the Orthoferrites" by Kurtzig et al, Vol. Mag. 4, No. 3, 9/68, p. 426–430.

*Primary Examiner*—Stanley M. Urynowicz, Jr.
*Attorney*—Lamoni B. Koontz et al.

[57] ABSTRACT

A beam addressed optical memory utilizing a magnetic medium for information storage is provided with improved tracking. Alternate tracks of first and second magnetic direction are provided on the magnetic medium. The interface between adjacent tracks defines a domain wall boundary. A plurality of alterable information bits having either the first or the second magnetic direction are centered essentially on the boundary.

8 Claims, 7 Drawing Figures

3696346
OR IN 365/122

INVENTOR.
JAMES DAVID ZOOK

BY [signature]

ATTORNEY.

INVENTOR.
JAMES DAVID ZOOK

BY [signature]
ATTORNEY.

INVENTOR.
JAMES DAVID ZOOK

BY [signature]
ATTORNEY.

BEAM ADDRESSED OPTICAL MEMORY

BACKGROUND OF THE INVENTION

The present invention is directed to an optical memory and in particular to a memory in which information is stored on a magnetic film.

The ever increasing needs for the storage of large quantities of data in modern computer systems have required the development of new techniques for information storage. Optical techniques permit high density information storage greater than that attainable with conventional magnetic recording. Other advantages of a beam addressed optical mass memory include a reduction in mechanical complexity and power consumption over previous large capacity memories, the reduction of mechanical wear and damage associated with read-write heads contacting the storage medium, and high speed addressing of information in the memory.

A highly advantageous optical information storage scheme utilizes a laser to provide Curie point writing on a ferromagnetic medium. Such a scheme was disclosed and claimed in U.S. Pat. No. 3,368,209 to L. D. McGlauchlin et al. and is assigned to the same assignee as the present invention. Utilizing manganese bismuth (MnBi) as the ferromagnetic medium in a Curie point writing system, packing densities of $1.5 \times 10^8$ bits per square inch have been demonstrated.

In beam addressed optical memories having extremely high packing densities, it is necessary that highly accurate beam positioning or "tracking" be achieved. This is necessary to ensure that the beam is accurately positioned with respect to an information bit during the writing, reading, and erasing stages of operation.

SUMMARY OF THE INVENTION

With the present invention improved tracking in a beam addressed optical memory is achieved. The beam addressed optical memory of the present invention utilizes a magnetic medium which is capable of having regions of first and second magnetization direction. A region having the first magnetization direction produces a first magneto-optic rotation while a region having the second magnetization direction produces a second magneto-optic rotation. Located on the magnetic medium is a first track having the first magnetization direction. Adjacent the first track on the magnetic medium is a second track having the second magnetization direction. The interface of the first and second tracks defines a boundary. Information is stored in the form of a plurality of alterable information bits on the magnetic medium having either the first or the second magnetization direction. Each of the bits is centered essentially on the boundary.

Light source means provide a polarized light beam incident the magnetic medium. First light beam positioning means position the polarized light beam with respect to the memory medium in a direction essentially parallel to the boundary while second light beam positioning means position the polarized light beam with respect to the magnetic medium in a direction essentially orthogonal to the boundary. Receiving the polarized light beam from the magnetic medium is balanced detector means which provides an output signal proportional to the net magneto-optic rotation of the polarized light beam by the magnetic medium.

Beam positioning feedback means direct a portion of the output signal to the second light beam positioning means so as to provide precise tracking of the polarized light beam along the boundary.

DETAILED DESCRIPTION OF THE PREFERRED EMBODIMENTS

Figure 1A:
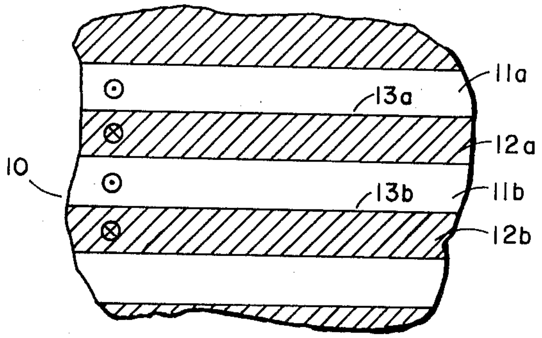
FIGS. 1*a* and 1*b* show a magnetic medium upon which a plurality of alterable information bits are stored according to the present invention.

Referring to FIG. 1*a*, there is shown a portion of a magnetic medium 10 which is capable of having regions of first and second magnetization direction. The first and second magnetization directions may be oriented normal to the plane of the magnetic medium, as in the case of MnBi, or may be oriented to lie in the plane of the magnetic medium, as in the case of europium oxide and permalloy film. Regions having the first magnetization direction produce a first magneto-optic rotation, and regions having the second magnetization direction produce a second magneto-optic rotation.

Located on magnetic medium 10 are first and second tracks 11 and 12 respectively. For illustrative purposes, two sets of such tracks are shown. However, it is to be understood that a practical beam addressed optical memory contains far more than two sets of tracks. First track 11 has the first magnetization direction while second track 12, which is adjacent first track 11 has the second magnetization direction. This interface of first and second tracks 11 and 12 defines a domain wall boundary 13. As shown in FIG. 1*a*, the first and second magnetization directions are oriented normal to the plane of the magnetic medium 10. However, it is to be understood that the techniques hereafter discussed for information storage are equally applicable when the first and second magnetization directions are oriented to lie in the plane of the magnetic medium 10.

In practice, first and second tracks 11 and 12 are produced in the following manner. Magnetic medium 10 is first magnetized in one direction, for example, the first magnetization direction. Then, utilizing Curie point writing or other applicable magnetic writing techniques, alternating tracks of the second magnetization direction are written. One advantage in utilizing this technique is that the tracks are magnetically written rather than burned, so that errors occurring during this process can be simply corrected by rewriting the tracks. One particularly advantageous way of writing the tracks is to use two coherent laser beams of sufficient intensity to write a magnetic grating, as described by R. S. Mesrich in Applied Optics 9, No. 10, P. 2,275 (Oct. 1970). This technique gives a precisely spaced band of tracks.

Figure 1B:
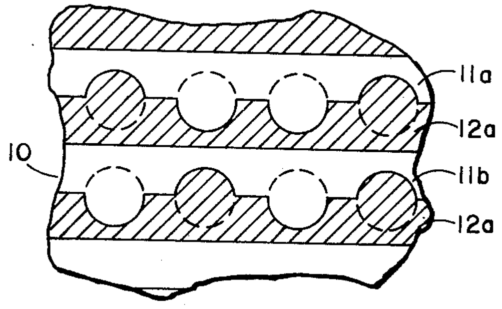

FIG. 1*b* shows a plurality of alterable information bits stored on the magnetic medium 10. For illustrative purposes, 4 bits have been shown on each of the boundaries 13*a* and 13*b*. The alterable information bits have either the first or the second magnetization direction and are centered essentially on boundary 13.

Figure 2:
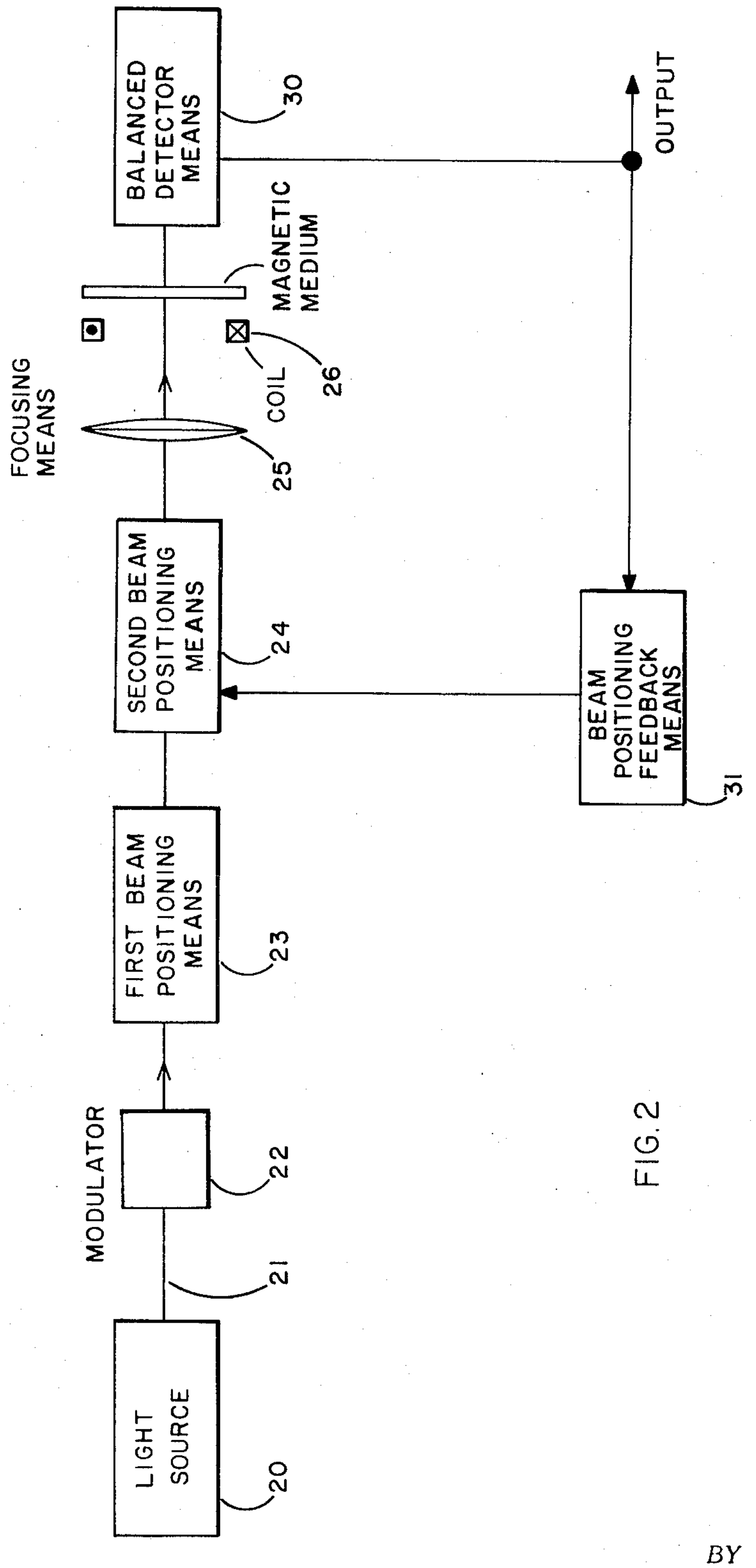
FIG. 2 schematically shows a beam addressed optical memory utilizing the improved information storage of the present invention.

Referring now to FIG. 2, there is shown a beam addressed optical memory utilizing the improved information storage shown in FIG. 1. Light source 20 provides a polarized light beam 21 which is incident magnetic medium 10. Modulator 22 controls the intensity of polarized light beam 21. First beam positioning means 23 positions polarized light beam 21 with respect to magnetic medium 10 in a direction essentially parallel to boundary 13. Second beam positioning means 24 positions polarized light beam 21 with respect to magnetic medium 10 in a direction essentially orthogonal to boundary 13. First and second beam positioning means 23 and 24 may for example comprise electro-optic, acousto-optic, or mechanical light beam deflectors. In addition, when magnetic medium 10 is in the form of a rotating disk or drum first beam positioning means 23 comprises the mechanical means for rotating magnetic medium 10.

Focusing means 25 focuses light beam 21 to the desired spot size at magnetic medium 10. Coil means 26 provides an external magnetic field to magnetic medium 10 during the writing stage of operation so that the information bits attain the desired magnetization direction.

The improved tracking in the present invention is achieved by monitoring the magneto-optic rotation from the magnetic medium as light beam 21 moves relative to magnetic medium 10. Balanced detector means 30 is positioned to receive light beam 21 from magnetic medium 10. As shown in FIG. 2, balanced detector means 30 receives that portion of light beam 21 which is transmitted by magnetic medium 10. In this manner the magneto-optic Faraday effect is monitored. However, it is to be understood that the magneto-optic Kerr effect, which utilizes that portion of light beam 21 which is reflected by magnetic medium 10 may be utilized as well. Balanced detector means 30 provides an output signal proportional to the net magneto-optic rotation of light beam 21 by magnetic medium 10. Two such balanced detector means are described by J. W. Beck in "Noise Considerations of Optical Beam Recording" Applied Optics, Volume 9, Number 11, pages 2,559 through 2,564, Nov. 1970. In particular, the two balanced detector means of interest are shown in FIGS. *6b* and *6c* on page 2,563 of the Beck article. Beam positioning feedback means 31 receives the output signal from balanced detector means 30 and directs a portion of the output signal to second light beam positioning means 24. This provides closed loop feedback control of the position of light beam 21 in the direction orthogonal to boundary 13.

To write a plurality of information bits on magnetic medium 10, modulator 22 first causes the intensity of light beam 21 to be insufficient to raise the medium temperature to its Curie point and thus alter the magnetization direction of magnetic medium 10. Light beam 21 is centered on a boundary 13 by second beam positioning means 24. Balanced detector means 30 provides the output signal which is proportional to the net magneto-optic rotation of light beam 21. When light beam 21 is centered on boundary 13, that portion of light beam 21 incident track 11 undergoes a first magneto-optic rotation while that portion of light beam 21 incident second track 12 undergoes a second magneto-optic rotation. When light beam 21 is centered on boundary 13, there will be no net magneto-optic rotation. The output signal from balanced detector means 30 is proportional to the net magneto-optic rotation such that when light beam 21 is centered on a boundary 13 there is no net output signal to feedback to second beam positioning means 24.

Once light beam 21 is centered on boundary 13, first beam positioning means 23 directs light beam 21 in a direction essentially parallel to boundary 13. If during its movement along boundary 13, light beam 21 drifts toward first track 11 such that light beam 21 is no longer centered on boundary 13, a non-zero net magneto-optic rotation results which is detected by balanced detector means 30. The output signal produced by detector means 30 is fed back by beam positioning feedback means 31 to second beam positioning means 24. Conversely, if light beam 21 drifts towards second track 12, the non-zero net magneto-optic rotation will again be sensed by balanced detector means 30 and an output signal of opposite sign is produced. Once again, the output signal is fed back to second beam positioning means 24 which corrects the position of light beam 21 in the direction orthogonal to boundary 13. The drift of the beam may be due, for example, to mechanical misalignment or misregistration of the beam positioning means with respect to the magnetic medium.

Writing of information bits is achieved when modulator 22 allows the intensity of light beam 21 to increase to an intensity sufficient to cause an area of magnetic medium 10 to be heated to a temperature above the Curie temperature. Modulator 22 then attenuates light beam 21 so as to allow the area of magnetic medium 10 which was heated above the Curie temperature to cool. The magnetization direction of the area is determined by the net magnetic field present at the area as the area cools to a temperature below the Curie temperature. Coil 26 provides an external magnetic field as the area cools which is sufficient to determine the magnetization direction of the bit. The magnetization direction of the bit is determined by the direction of the magnetic field from the coil which is determined by the polarity of the voltage applied to the coil. Referring again to FIG. 1*b*, it can be seen that a lower demagnetizing field exists when the information bits are written on a boundary. The de-magnetizing field is zero at the center of the bit. This reduction in the de-magnetizing field allows the magnitude of the field produced by coil 26 to be such that coil 26 can be switched at high bit rates required for high speed writing.

The reading operation is similar to the writing operation described above. However, during reading modulator 22 maintains the intensity of light beam 21 at a level insufficient to heat magnetic medium 10 above the Curie temperature. As in the writing operation, light beam 21 is centered on boundary 13 and maintained on center by feedback of a portion of the output signal to second beam positioning means 24. When light beam 21 reaches the written information bit, and output signal is produced by detector means which is proportional to the net magneto-optic rotation produced by the bit. It can be seen that the polarity of the output signal will determine whether the bit had the first or the second magnetization direction. During readout the output signal from balanced detector means 30 is directed to the output of the memory as well as to beam positioning feedback means 31. It can be seen that each time an information bit is read out a large output signal is produced even though light beam 21 is in fact centered on boundary 13. Therefore, it may be necessary for beam positioning feedback means 31 to include a discriminator circuit such that the output signal produced when reading an information bit is not fed back to second beam positioning means 24.

Figure 3:
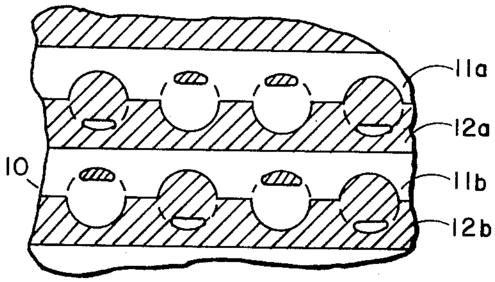
FIG. 3 shows the effect of an insufficient magnetic field during writing on the storage of information bits on the magnetic film.

FIG. 3 shows the effect on information bits when the external magnetic field produced by coil 26 is insufficient to completely write the bit. It can be seen that while the small regions of opposite magnetization reduce the readout signal to some extent, the properly written portions of the information bits are considerably larger than incorrectly written areas, so that there should be an adequate output signal for information readout.

The beam addressed optical memory of the present invention is far less affected by changes in the average level from these information bits than are the prior art memories. These changes in the average level of the output signal may be caused the incomplete writing as shown in FIG. 3 or by a gradual change from one temperature dependent crystallographic phase to another phase. In the case of MnBi such a crystallographic phase change occurs between the low temperature "-normal" phase and the high temperature "quenched" phase. In the present invention the readout signal of a bit is not influenced by the unwritten background since the background gives a balanced signal. In other words, the net magneto-optic rotation from the background is zero so long as light beam 21 is centered on boundary 13. This is of particular importance, since light beam 21 ordinarily has a Gaussian intensity distribution, and therefore the size of the bit written by light beam 21 is ordinarily smaller than the actual width of the beam. In the prior art systems if the same beam is used for reading as for writing, a portion of the reading beam passes through the unwritten background, thereby reducing the signal-to-noise ratio during readout. One proposed method for alleviating this difficulty is to reduce the size of the readout beam. With the present invention, however, it is not necessary to change the size of the reading beam since the unwritten background produces a balanced signal.

Figure 4:
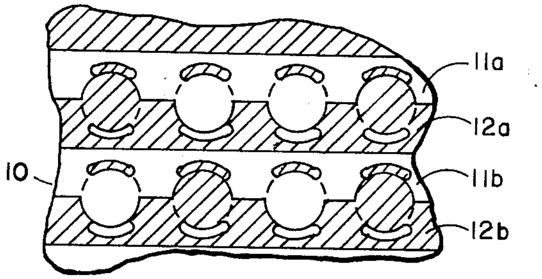
FIG. 4 shows the effect of misregistration on the storage of information bits on the magnetic medium.

Another advantage of the present invention lies in the fact that misregistration history does not result in reading errors on the average. In FIG. 4 is shown a plurality of information bits after a large number of rewrite cycles. During some of the rewrite cycles, light beam 21 was slightly displaced off center from boundary 13 such that the written spots shown in FIG. 4 are surrounded by incompletely rewritten regions. On the average, the incompletely rewritten regions due to misregistration are of equal area so that the net magneto-optic rotation from the regions cancel. The incompletely rewritten regions have the effect of further reducing the closure flux, thereby reducing the required external magnetic field from coil 26 during writing. Thus, the writing characteristics actually improve with repeated rewrite cycles.

Still another advantage of the present invention is the elimination of a separate erase operation before rewriting. As described above, misregistration is not as serious a problem in the present invention as in the prior art beam addressed optical memories. In addition, coil 26 must be energized each time an information bit is written, whether it has the first or the second magnetization direction.

Still another advantage of the present invention is that the fringing fields present in the present invention are quite low. Therefore, there is less disturbance and chance for magnetic pickup in the electronic systems associated with the memory. Such electronic systems include the sensors that sense the position of the optical system with respect to the rotating disk or drum when a rotating magnetic medium is utilized.

Another feature of the present invention is that the unwritten tracks provide a means for optimizing the focusing of the beam. One way to accomplish this is to move the beam across a band of tracks on the magnetic medium at a predetermined rate in a direction orthogonal to the track direction. The balanced detector then produces an AC signal at the frequency with which the beam crosses the tracks. The focusing means can then the positioned by a servo system so that the AC signal is maximumed, corresponding to maximum focused spot size, and hence optimum focusing.

Figure 5:
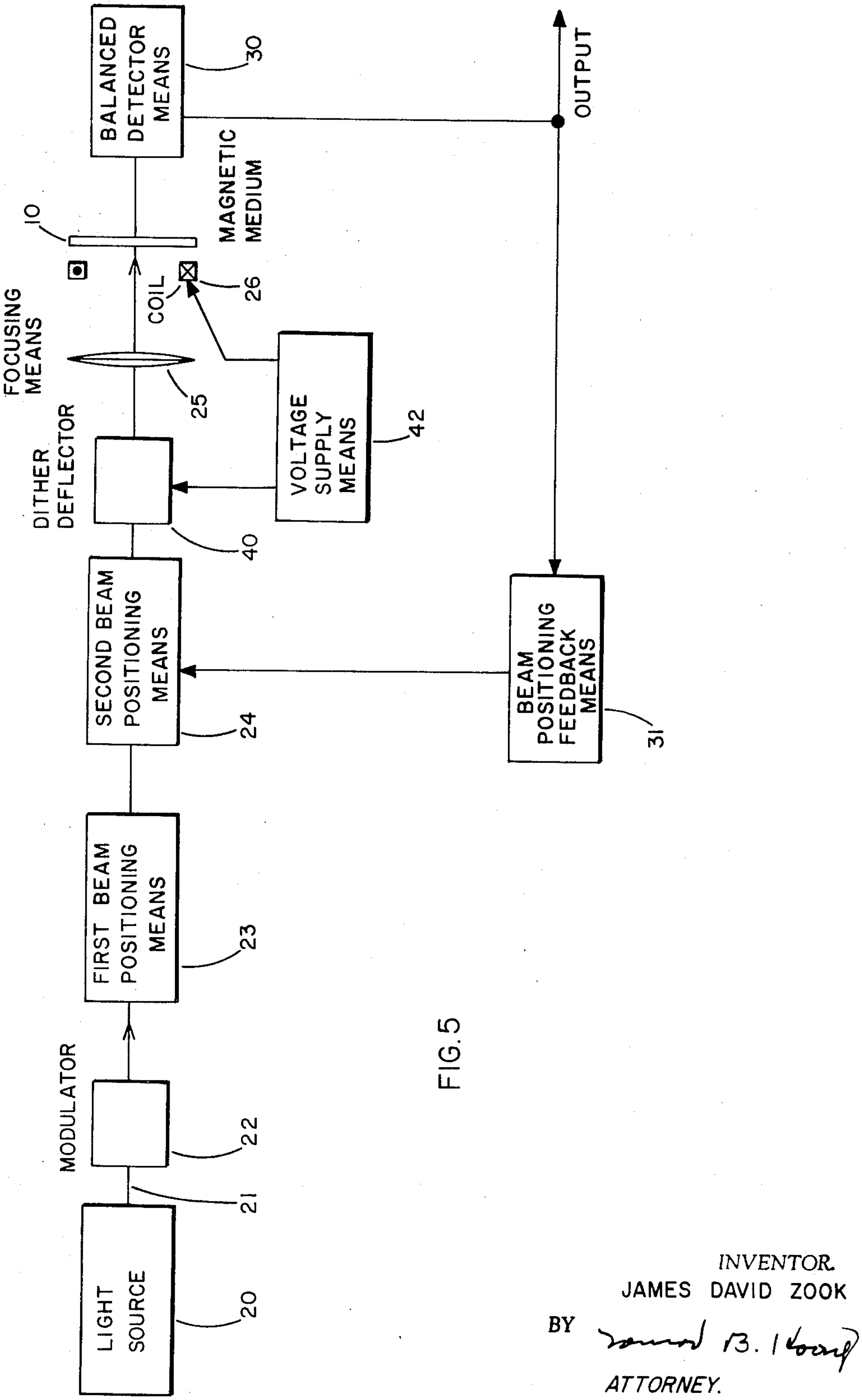
FIG. 5 is a schematic diagram of modified apparatus for a beam addressed optical memory of the present invention.

FIG. 5 shows another embodiment of a beam addressed optical memory of the present invention. The system shown in FIG. 5 is similar to that shown in FIG. 2 and similar numerals are used to designate similar elements. In addition, dither deflector 40, which may comprise a small electro-optic, acousto-optic, or mechanical light beam deflector, is used to aid in writing to further reduce the external magnetic field required for writing. Dither deflector 40 deflects light beam 21 in the direction orthogonal to boundary 13. To write a bit of first magnetization direction, dither deflector 40 deflects light beam 21 down into second track 12. Conversely to write a bit of second magnetization direction, dither deflector 40 deflects light beam 21 up into first track 11. In the preferred embodiment the amount of deflection is one-half of a written spot diameter. It can be seen that the requirements for dither deflector 40 are minimal, since the speed of dither deflector 40 is the same as that of modulator 22, and the amount of deflection is extremely small—one-half spot. As shown in FIG. 5, voltage supply means 42 supplies the voltage to coil 26. The polarity of the voltage applied depends on the desired magnetization direction of the information bit being written. By proper arrangement, dither deflector 40 may also be controlled by voltage supply means 42, with the voltage being applied to dither deflector 40 at the same time and with the same polarity as to coil 26.

In the system shown in FIG. 5, it can be seen that the reduction of beam size during reading is not as necessary as in the prior art beam addressed optical memories. The effective written spot is centered on boundary 13, but only the area on one side of boundary 13 need be written. Thus the effective written area of an information bit is larger (as much as a factor of 2 larger) than the area actually written.

Figure 6:
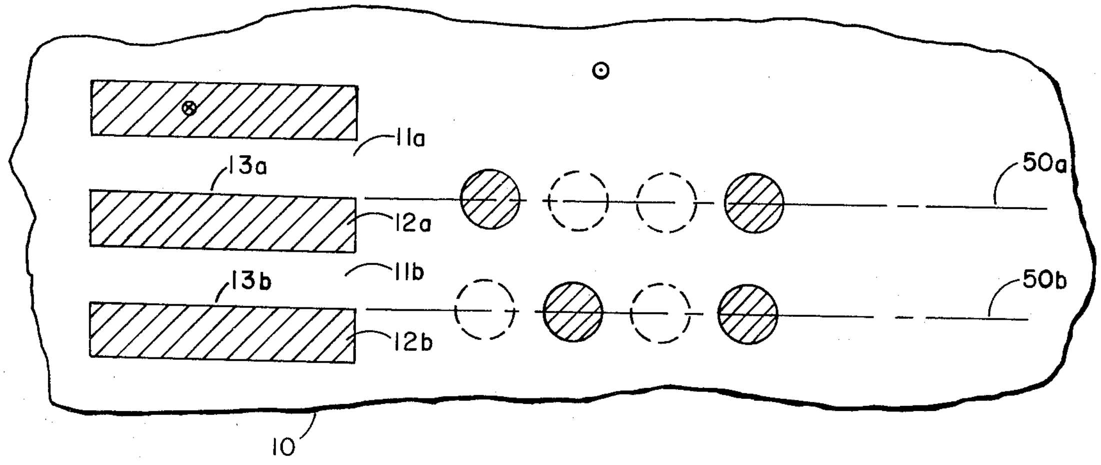
FIG. 6 shows another scheme for storing a plurality of alterable information bits along a boundary.

In certain applications it may not be desirable to write the information bit on a domain wall boundary. Therefore, in FIG. 6 is shown another embodiment of the present invention in which a plurality of information bits are centered on an imaginary line 50 centered on and extending from a domain wall boundary 13*a*. As shown in FIG. 6, first and second tracks 11 and 12 are not continuous, but are of finite length. As described in reference to previous embodiments, light beam 21 is centered on domain boundary 13 in the tracking region and then is directed by first beam positioning means 23 along boundary 13 toward the information storage region. Light beam 21 continues to be centered on imaginary center line 50, which is an extension of boundary 13. Therefore, each of the information bits recorded is centered on center line 50.

It is to be understood that this invention has been disclosed with reference to a series of preferred embodiments and it is possible to make the changes in form and detail without department from the spirit and scope of the invention.

The embodiments of the invention in which an exclusive property or right is claimed are defined as follows:

1. A beam addressed optical memory comprising:

a magnetic medium capable of having regions of first and second magnetization direction, a region having the first magnetization direction producing a first magneto-optic rotation, and a region having the second magnetization direction producing a second magneto-optic rotation, a first track on the magnetic medium, the first track having the first magnetization direction, a second track on the magnetic medium adjacent the first track and having the second magnetization direction, the interface of the first and second tracks defining a boundary, a plurality of alterable information bits on the magnetic medium having either the first or the second magnetization direction, each of the bits being centered essentially on the boundary, light source means for providing a polarized light beam incident the magnetic medium, first beam positioning means for positioning the polarized light beam with respect to the magnetic medium in a direction essentially parallel to the boundary, second beam positioning means for positioning the polarized light beam with respect to the magnetic medium in a direction essentially orthogonal to the boundary, coil means for providing an external magnetic field to the magnetic medium during the writing of the alterable information bits, balanced detector means positioned to receive the polarized light beam from the magnetic medium and for providing an output signal proportional to the net magneto-optic rotation of the polarized light beam by the magnetic medium, and beam positioning feedback means for directly a portion of the output signal to the second light beam positioning means.

2. The beam addressed optical memory of claim 1 wherein the first and second magnetization directions are normal to the plane of the magnetic medium.

3. The beam addressed optical memory of claim 2 wherein the magnetic medium is manganese bismuth film.

4. The beam addressed optical memory of claim 1 and further comprising dither deflector means for deflecting the polarized light beam in a direction essentially orthogonal to the boundary, the dither deflector means deflecting the polarized light beam into the first track when an information bit having the second magnetization direction is written, and deflecting the polarized light beam into the second track when an information bit having the first magnetization direction is written.

5. The beam addressed optical memory of claim 4 and further comprising the voltage supply means for simultaneously applying a voltage to the dither deflector means and the coil means, the polarity of the voltage supply being dependent upon the magnetization direction of the information bit being written.

6. A beam addressed optical memory means comprising:

a magnetic medium capable of having regions of first and second magnetization direction, a region having the first magnetization direction producing a first magneto-optic rotation, and a region having the second magnetization direction producing a second magneto-optic rotation, a first track on the magnetic medium, the first track having the first magnetization direction, a second track on the magnetic medium adjacent the first track and having the second magnetization direction, the interface of the first and second tracks defining a boundary, a plurality of alterable information bits on the magnetic medium having either the first or the second magnetization direction, each of the bits being centered essentially on an imaginary line extending from the boundary, light source means for providing a polarized light beam incident the magnetic medium, first beam positioning means for positioning the polarized light beam with respect to the magnetic medium in a direction essentially parallel to the boundary, second beam positioning means for positioning the polarized light beam with respect to the magnetic medium in a direction essentially orthogonal to the boundary, coil means for providing an external magnetic field to the magnetic medium during the writing of the alterable information bits, balanced detector means positioned to receive the polarized light beam from the magnetic medium and for providing an output signal proportional to the net magneto-optic rotation of the polarized light beam by the magnetic medium, and beam positioning feedback means for directing a portion of the output signal to the second light beam positioning means.

7. The beam addressed optical memory of claim 6 wherein the first and second magnetization directions are normal to the plane of the magnetic medium.

8. The beam addressed optical memory of claim 7 wherein the magnetic medium is manganese bismuth film.

* * * * *